United States Patent [19]

Wong

[11] Patent Number: 5,360,662
[45] Date of Patent: Nov. 1, 1994

[54] FABRICATION OF RELIABLE CERAMIC PREFORMS FOR METAL MATRIX COMPOSITE PRODUCTION

[75] Inventor: Boon Wong, Canoga Park, Calif.

[73] Assignee: Hughes Aircraft Company, Los Angeles, Calif.

[21] Appl. No.: 850,474

[22] Filed: Mar. 12, 1992

[51] Int. Cl.$^5$ .............. C04B 35/56; B22D 19/00; B32B 3/26

[52] U.S. Cl. .................. 428/288; 428/289; 428/312.2; 428/312.6; 428/312.8; 428/317.9; 428/375; 428/404; 428/614; 428/689; 428/698; 501/88; 501/95; 164/97; 164/100; 164/101

[58] Field of Search ............ 428/224, 288, 289, 312.2, 428/312.6, 312.8, 317.9, 375, 404, 614, 689, 698; 501/88, 95; 164/97, 100, 101

[56] References Cited

U.S. PATENT DOCUMENTS

| | | | |
|---|---|---|---|
| 4,818,633 | 4/1989 | Dinwoodie et al. | 428/614 |
| 4,828,774 | 5/1989 | Andersson et al. | 264/60 |
| 4,831,707 | 5/1989 | Goddard et al. | 29/419.1 |
| 4,847,220 | 7/1989 | Lesher et al. | 501/89 |
| 4,899,800 | 2/1990 | Gallerneault et al. | 164/58.1 |
| 5,141,683 | 8/1992 | Hyndman et al. | 264/44 |
| 5,164,346 | 11/1992 | Giunchi et al. | 501/95 |

*Primary Examiner*—George F. Lesmes
*Assistant Examiner*—Kathryne E. Shelborne
*Attorney, Agent, or Firm*—M. E. Lachman; M. W. Sales; W. K. Denson-Low

[57] ABSTRACT

Sintered ceramic preforms for metal matrix composites fabricated by a method comprising: (a) preparing a homogeneous mixture containing appropriate amounts of silicon-containing fibers/particulates, such as silicon carbide, at least one solvent, at least one polymer, and an oxide-containing material, such as boric acid or phosphoric acid, capable of forming a low melting silicate with a silicon oxide, such as a borosilicate; (b) shaping a green ceramic preform from the mixture, such as by injection molding; (c) removing the solvent(s) and the polymer(s); (d) oxidizing the surfaces of the silicon-containing fibers to form a layer of the silicon oxide thereon; (e) heating the preform to a temperature sufficient to react the oxide-containing material with the silicon oxide to form the low melting silicate material; (f) liquid phase sintering the fibers in the presence of liquid silicate material to strengthen the preform; and (g) cooling the sintered preform to ambient. The sintered ceramic preform prepared by this method is sufficiently strong to withstand pre-infiltration handling and squeeze casting to inject molten metal under pressure into the pores of the preform.

6 Claims, No Drawings

FABRICATION OF RELIABLE CERAMIC PREFORMS FOR METAL MATRIX COMPOSITE PRODUCTION

BACKGROUND OF THE INVENTION

1. Field of the Invention

The present invention relates to ceramic fiber/particulate reinforced light metal matrix composites, and, more particularly, to a novel method of preparing ceramic preforms for metal matrix composite production.

2. Description of Related Art

Ceramic fiber/particulate reinforced light metal matrix composites are excellent structural materials in the automobile and aerospace industries because of their high strength-to-weight ratios, elastic moduli, as well as heat and corrosion resistances.

One method of producing structural parts of these materials is the so-called "squeeze casting" process, in which a porous ceramic fiber preform is infiltrated with molten metal under a high pressure at an elevated temperature. The ceramic preform, if not properly strengthened, however, may crack or even shatter during pre-infiltration handling or under the high pressure and temperature conditions during the squeeze casting process.

Thus, a ceramic preform having the requisite strength to withstand the pre-infiltration handling procedure and the squeeze casting process, while possessing the desired porosity to accept the influx of molten metal under pressure, is required.

SUMMARY OF THE INVENTION

In accordance with the invention, a mechanically strong and porous sintered ceramic fiber preform is provided. The ceramic preform is characterized by ceramic fibers/particulates coated with a glassy silicate layer. These fibers/particulates are chemically bonded together by the glassy silicate layer to form a three-dimensional network structure containing the proper amount of highly interconnected pore capillaries.

Further in accordance with the invention, a method is provided for preparing the sintered ceramic fiber preform. The method comprises:

(a) preparing a homogeneous mixture containing appropriate amounts of silicon-containing fibers/particulates, at least one solvent, at least one polymer, and an oxide-containing material capable of forming a low melting silicate with a silicon oxide;

(b) shaping a green ceramic preform from the mixture;

(c) removing the solvent(s) and the polymer(s);

(d) oxidizing the surfaces of the silicon-containing fibers to form a layer of the silicon oxide thereon;

(e) heating the preform to a temperature sufficient to react the oxide-containing material with the silicon oxide to form the low melting silicate material;

(f) liquid phase sintering the fibers in the presence of the liquid silicate material to strengthen the preform; and (g) cooling the sintered preform to ambient.

Compared with the traditional preform strengthening through slow and high-temperature mechanisms of solid state sintering, the strengthening method of the invention provides the porous ceramic preform with a higher strength, yet employing a short-term, low temperature sintering procedure. The preform prepared by this method is sufficiently strong to withstand pre-infiltration handling and squeeze casting to inject molten metal under pressure into the pores of the preform.

DESCRIPTION OF THE PREFERRED EMBODIMENTS

In the conventional fabrication of ceramic fiber preforms for metal matrix composites, a ceramic-polymer mixture is prepared, comprising the ceramic material in the form of fibers, solvent, and binder, which is a polymer. The mixture is then injection-molded to shape the green ceramic preform. The solvent is removed, followed by calcining to remove the binder. The preform is then sintered, and the result is a porous ceramic preform. Molten metal is then forced into the pores by heat and pressure to provide the desired metal matrix composite.

In the novel method of preparing reliable ceramic fiber preforms for metal matrix composite production, a low melting glass-forming constituent is added into the ceramic-polymer mixture before injection molding. After removal of the solvent by dissolution and after removal of the polymer by calcination processes, a subsequent strengthening of the ceramic preform is achieved by a short-term, low temperature sintering procedure in the presence of the liquid phase. During the calcination, the surfaces of the ceramic fibers, which contain silicon, are oxidized to form a layer of a silicon oxide thereon. The low melting glass-forming constituent then reacts with the silicon oxide to form a low melting silicate layer on the surfaces of the ceramic fibers.

The teachings of this invention are suitably employed to coat both ceramic fibers and particulates, and hence these terms are used interchangeably herein. Both ceramic fibers and particulates, when processed in accordance with the invention, form ceramic preforms having a three-dimensional network structure.

The following example is provided to illustrate how the disclosed method may be applied to the conventional preform production procedure to prepare mechanically reliable silicon carbide fiber preforms. Silicon carbide ceramic fibers are typically used for aluminum alloy matrix composite production. This example, however, should not be viewed as limiting the scope of this invention.

(1) A homogeneous mixture containing appropriate amounts of silicon carbide fibers, diphenyl carbonate (solvent), polystyrene (binder), and boric acid or phosphoric acid is prepared. The green preform is usually comprised of 90 to 50 volume percent of solvent(s) plus polymer(s) and 10 to 50 volume percent of silicon carbide ceramic fibers and boric acid or phosphoric acid. The amount of boric or phosphoric acid comprises about 2 to 20 weight percent of the total silicon carbide fiber content.

(2) A green ceramic preform is shaped from the mixture by injection molding.

(3) The diphenyl carbonate is removed by dissolution in methanol/acetonitrile.

(4) The preform is calcined (pre-heated) in air. This procedure burns off the polystyrene, thermally dehydrates the boric acid to produce boric oxide, and at the same time, slightly oxidizes the surfaces of the ceramic fibers (forming a surface silicon oxide) in the preform. The surface silicon oxide may be silicon monoxide, silicon dioxide, or a mixture thereof. Pore capillaries remain where the solvent(s) and polymer(s) were removed. Where phosphoric acid is used in place of boric acid, phosphorus oxide is formed by thermal dehydration.

(5) Heating of the preform at substantially the same temperature is continued, and the boric and silicon oxides on the fiber surfaces are allowed to completely react to form a low melting borosilicate material, which forms a coating layer on the surfaces of the ceramic fibers. The preferred thickness of the borosilicate compound layer is about 2 micrometers or less. Most probably, the crystalline borosilicate layer forms first before melting. This layer will become a liquid beyond the melting point (eutectic/liquidus temperature). The temperature of the preform is then raised above the melting point of the borosilicate material. The resulting viscous borosilicate liquid wets the fibers during liquid phase sintering; this process allows the liquid borosilicate, which subsequently forms the glass phase upon cooling, to develop a chemical bond between fibers, and thereby strengthens the preform at a low sintering temperature. Where phosphoric acid is used, a phosphosilicate material is formed in place of the borosilicate material.

The critical steps to produce reliable silicon carbide fiber preforms for high-quality aluminum alloy matrix composite production include (a) a homogeneous blend of the boric acid in the ceramic-polymer mixture, (b) a well-controlled temperature, time, and atmosphere during the oxidation process of the silicon carbide fiber surfaces in the preform, and (c) an optimized liquid phase sintering procedure (sintering temperature and time) for the subsequent preform strengthening.

The method of the invention is applicable to the use of any silicon-containing ceramic material, such as silicon carbide and silicon nitride. Such silicon-containing ceramic materials form a silicon oxide on the surface of the fibers during calcination of the preform.

The method of the invention may use any of the oxides which result in the formation of low melting silicon-containing glasses. By "low-melting" is meant that the eutectic/liquidus temperature of the glass-forming compound is only slightly higher than the temperature of calcining/preheating the preform. Examples of low melting silicon-containing glasses include borosilicate glasses, formed from the reaction of boric acid (boric oxide) and a silicon oxide, and phosphosilicate glasses, formed from the reaction of phosphoric acid (phosphorus pentoxide) and a silicon oxide.

The preforms strengthened in accordance with the teachings of the invention may be injected with any of the common light weight metals, that is, metals having a density of less than about 4 grams per cubic centimeter. Examples of such metals include aluminum, beryllium, magnesium, alloys thereof, and the like, which, in conjunction with the ceramic preforms of the invention, form a light weight, metal matrix composite having a high strength-to-weight ratio.

Thus, there have been provided a mechanically strong and porous ceramic preform and method of making the same. It will be readily apparent to those skilled in the art that various changes and modifications of an obvious nature may be made without departing from the scope of the invention, and all such changes and modifications are considered to fall within the scope of the invention as defined by the appended claims.

I claim:

1. A sintered ceramic preform for metal matrix composites wherein said sintered ceramic preform consists essentially of a porous mass of silicon-containing fibers/particulates having a thin layer consisting essentially of a coating of a glassy silicate thereon and chemically bonded by said layer of said glassy silicate thereon to form said sintered ceramic preform, wherein said thin layer of sad glassy silicate has substantially uniform thickness of at most about 2 micrometers.

2. The ceramic preform of claim 1 wherein said preform comprises about 90 to 50 volume percent of pore capillaries and about 10 to 50 volume percent of fibers/particulates and has a three-dimensional network structure.

3. The ceramic preform of claim 1 wherein said silicon-containing fibers/particulates are selected from the group consisting of silicon carbide and silicon nitride.

4. The ceramic preform of claim 1 wherein said glassy silicate is selected from the group consisting of borosilicates and phosphosilicates.

5. The ceramic preform of claim 1 wherein said sintered ceramic preform has pores that are substantially filled with a light weight metal having a density less than about 4 grams per cubic centimeter.

6. The ceramic preform of claim 5 wherein said light weight metal is selected from the group consisting of aluminum, beryllium, magnesium, and alloys thereof.

* * * * *